(12) United States Patent  
Marshall

(10) Patent No.: US 6,481,140 B1  
(45) Date of Patent: Nov. 19, 2002

(54) FIREARM SAFETY SYSTEM WITH IMPLANTED COMPUTER CHIP

(76) Inventor: William Marshall, 2036 Touraine La., Half Moon Bay, CA (US) 94019

( * ) Notice: Subject to any disclaimer, the term of this patent is extended or adjusted under 35 U.S.C. 154(b) by 0 days.

(21) Appl. No.: 09/724,759

(22) Filed: Nov. 28, 2000

(51) Int. Cl.[7] ................................................ F41A 17/06
(52) U.S. Cl. ..................................... 42/70.11; 42/70.01
(58) Field of Search .......................... 42/70.01, 70.06, 42/70.07, 70.08, 70.11

(56) References Cited

U.S. PATENT DOCUMENTS

| | | | |
|---|---|---|---|
| 5,016,376 A | * | 5/1991 | Pugh ......................... 42/70.11 |
| 5,083,392 A | | 1/1992 | Bookstaber |
| 5,123,193 A | * | 6/1992 | Pugh ......................... 42/70.11 |
| 5,322,034 A | | 6/1994 | Willham et al. |
| 5,459,957 A | | 10/1995 | Winer |
| 5,487,234 A | | 1/1996 | Dragon |
| 5,598,151 A | | 1/1997 | Torii, Jr. |
| 5,603,179 A | * | 2/1997 | Adams ....................... 42/70.08 |
| 5,638,832 A | | 6/1997 | Singer et al. |
| 5,675,925 A | | 10/1997 | Würger |
| 5,772,671 A | | 6/1998 | Harmon |
| 5,832,090 A | | 11/1998 | Raspotnik |
| 5,833,603 A | | 11/1998 | Kovacs et al. |
| 5,860,241 A | | 1/1999 | Waters |
| 5,864,580 A | | 1/1999 | Lowe et al. |
| 5,879,375 A | | 3/1999 | Larson, Jr. et al. |
| 5,915,936 A | * | 6/1999 | Brentzel .................... 42/70.11 |
| 5,924,232 A | * | 7/1999 | Rhoden et al. ............ 42/70.11 |
| 5,937,557 A | | 8/1999 | Bowker et al. |
| 5,946,840 A | * | 9/1999 | Mickel ...................... 42/70.11 |
| 5,953,844 A | | 9/1999 | Harling et al. |

* cited by examiner

Primary Examiner—Michael J. Garone  
Assistant Examiner—Gabriel S Sukman  
(74) Attorney, Agent, or Firm—Burns, Doane, Swecker & Mathis, L.L.P.

(57) ABSTRACT

A firearm safety system for the prevention of undesired or unauthorized discharge of a firearm by a person other than an authorized person. The safety system is made up of a computer chip which is implanted into the authorized user's anatomy for verification of the user. The information from the computer chip is received by a sensor connected to a firearm and the information processed by a processor. If the information received from the computer chip matches that of an authorized user, the firearm can be discharged by the authorized user.

22 Claims, 4 Drawing Sheets

FIREARM SAFETY SYSTEM WITH IMPLANTED COMPUTER CHIP

BACKGROUND

1. Field of Invention

This invention relates to a firearm safety system for prevention of undesired or unauthorized discharge of a firearm by a person other than the authorized person.

2. Background of the Invention

One of the biggest concerns in American Society today is gun control. These concerns include accidental shootings, the use of guns by children, possession of firearms by criminals, and the shooting of police officers and law enforcement agents with the officer or agent's weapon in the line of duty.

Over the years, there have been numerous attempts to improve gun safety by use of mechanical safety locks. Some of the initial attempts at safety were by the design of trigger locks. The trigger lock is traditionally operated by a key and prevents the firearm from being used unless the lock is removed. However, if someone has access to the key, the trigger lock can be removed and the firearm discharged. Accordingly, it does not eliminate firearm use by a child or intruder. Furthermore, if the lock is not used, the firearm may be discharged by anyone who has access to the firearm.

In addition to trigger locks, additional anti-theft alarm devices have been developed utilizing motion sensors and alarms. Dragon, U.S. Pat. No. 5,487,234, disclosed a firearm locking device with a motion sensor and alarm that incorporated a self-conforming trigger lock which prevented access to the trigger and unauthorized operation of the firearm. The lock had a clamp and an alarm which housed a motion sensor for detection of movement of the firearm and activation of the alarm. If the firearm was moved, the device would generate an audible alarm sound whose object was to frighten or deter the thief.

In Torii, Jr., U.S. Pat. No. 5,598,151, a repository for a firearm was described which operated in conjunction with a system which generated a signal upon an emergency or unauthorized opening of the repository. The signal was generated at a remote location and indicated whether the firearm had been accessed and/or removed either in an intended manner, under an emergency situation or duress.

In addition to locking devices, firearms have been designed with devices to prevent the firearm from discharging absent acknowledgment of an authorized user. Harling, et al., U.S. Pat. No. 5,953,844 disclosed a system based on safety system utilizing a coded signal worn by the authorized user. The system utilizes a transceiver which is activated by movement of the trigger at which time a coded signal is received by a remote token which receives the coded signal and transmits a signal for verification of the user and authorization to fire the weapon. If the signal was not received, the firearm would not discharge when needed, thus possibly endangering an officer or citizen in need of self defense.

Identification systems utilizing personalized code keys, palm and/or finger prints, and voice recognition have also been developed. In Mickel, U.S. Pat. No. 5,946,840 the use of a personalized code key which is inserted into the handle of a weapon was utilized. The code key is carried by an authorized user and inserted into the handle of the weapon to allow the weapon to be fired. The risk with this system is that an unauthorized person, such as a child, has the possibility of obtaining the code key, then operating the firearm.

Bowker, U.S. Pat. No. 5,937,557 describes the use of finger prints for authorized users of the firearm. Brentzel, U.S. Pat. No. 5,915,936 uses pressure and scanning sensors for the reading of palm prints for authorization of predetermined users.

Meanwhile, Winer, U.S. Pat. No. 5,459,957 utilized voice recognition technology to enable and disable the firearm. Until verification is received through voice recognition, the firearm remains in a disabled state.

Some of the drawbacks to the voice recognition and palm/finger print recognition safety systems involve the possibility of rejection of the user due to variations in the biometric sample. For example, a police officer may encounter a situation where he may be unable to speak, or due to excessive perspiration on the sensing device, the palm or finger print verification system may not operate correctly and may prevent needed use of the firearm by its rightful operator.

For the foregoing reasons, what is needed is a firearm safety system which allows only authorized users to discharge the firearm, but avoids the disadvantages of the prior systems.

SUMMARY OF THE INVENTION

The present invention is directed to a firearm safety system that satisfies the need for improved gun safety by allowing firearms to be discharged only by authorized users. The system comprises a computer chip which is implanted into the human anatomy, and a firearm which has a safety switch operable between a first position preventing discharge of the firearm and a second position allowing discharge of the firearm.

This invention provides a firearm safety system which utilizes a coded computer chip which is implanted into the authorized user's finger or hand for identification and verification of the user. The information from the coded computer chip is received by a sensor connected to the firearm and the information is processed by a computer. If the information received from the computer chip matches that of an authorized user, the firearm can then be discharged by that authorized user.

This is accomplished by the implantation of a computer chip in the authorized user's finger or anatomy, and a sensor, memory unit and processor within the firearm. Upon the sensors receipt of an authorized signal from the computer chip which is processed by the processor the firearm will discharge.

The safety switch is controlled by a processor which is connected to a sensor for receiving a signal from the computer chip, and a memory unit for storing authorization codes representative of the signal received from the computer chip of authorized users. The coded signal received from the computer chip is compared to the authorization codes stored in the memory unit.

If a signal is not received by the sensor or if the coded signal does not match the authorization code within the memory unit, the safety switch will remain in the first position preventing the firearm from discharging. If the coded signal received from the computer chip by the sensor matches the authorization code stored in the memory unit, the processor will cause the safety switch to move to the second position which allows the firearm to be discharged.

BRIEF DESCRIPTION OF THE DRAWINGS

These and other features, aspects, advantages of the present invention will become better understood with regards to the following description, appended claims, and accompanying drawings where:

DESCRIPTION OF THE INVENTION

The firearm safety system is designed for use with all type of firearms, including handguns, pistols, and rifles. The system may be manufactured with the sensor, memory unit and processor in the handle of the firearm or added to an existing firearm with proper modifications. FIGS. 1 through 7 show the firearm safety system of the present invention as applicable to a handgun, however, it should be understood that the following description is equally applicable to any type of firearm.

Figure 1:
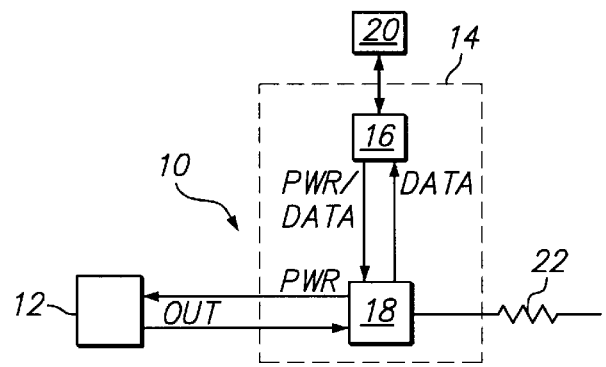
FIG. 1 is a block diagram and electrical schematic of a computer chip.

A computer chip 10 is carried by the authorized user, and is preferably implanted into the human anatomy. As shown in FIG. 1, the computer chip 10 should include a sensor 12 and a transponder 14 having at least one energy coupler 16 and a control circuit 18. After implantation, an energy coupler 16 couples power and any command signals from a remote interrogator or reader 20 to the control circuit 14, which in turn, energizes the computer chip 10. Upon being energized, the sensor 12 will provide an output signal to the control circuit 18. The control circuit 18 sends a coded signal 22 for the particular firearm. Thus, the computer chip 10 does not require a battery or other source of electrical power, and can be activated by a remote interrogator or reader 20.

Figure 2:
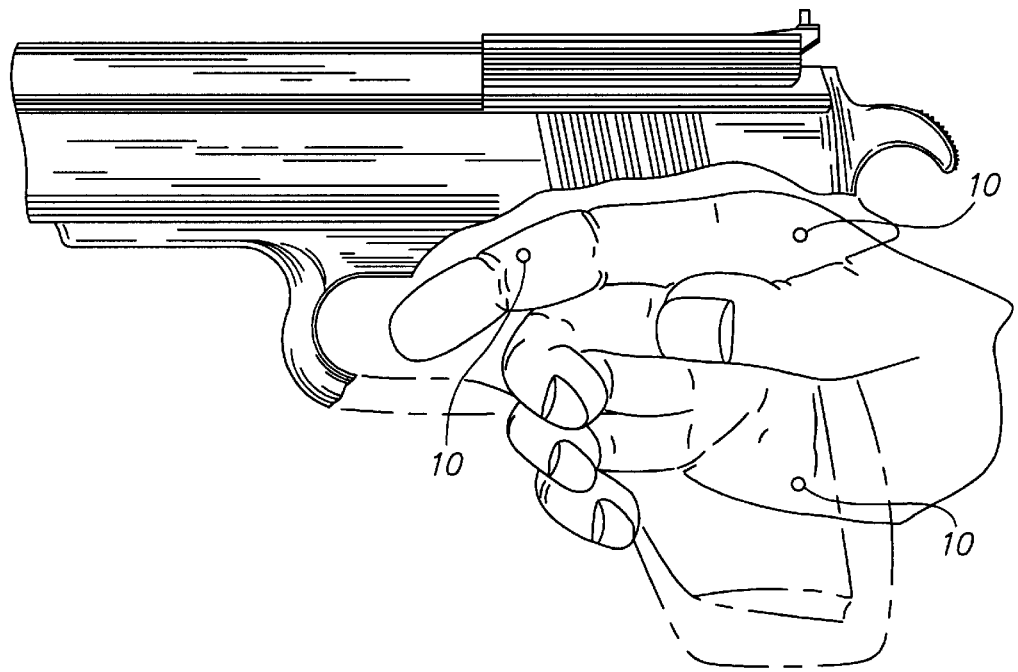
FIG. 2 is a perspective view of a firearm with the computer chip implanted into the hand of an authorized user.

As illustrated in FIG. 2, the computer chip 10 will preferably be implanted into the finger, palm or other part of the authorized user's hand which will provide maximum safety. However, the computer chip 10 may be implanted into any part of the authorized user's anatomy. The location of the computer chip 10 will depend on the design of the safety system as well as authorized user's preferences. For example, the firearm safety system can be designed so that the computer chip 10 is no more than 2 to 3 inches from the sensor. Alternatively, if other safety issues are involved, the firearm safety system can be best designed with the computer chip 10 implanted in the abdomen or leg, or any other distance chosen by the user.

Figure 3:
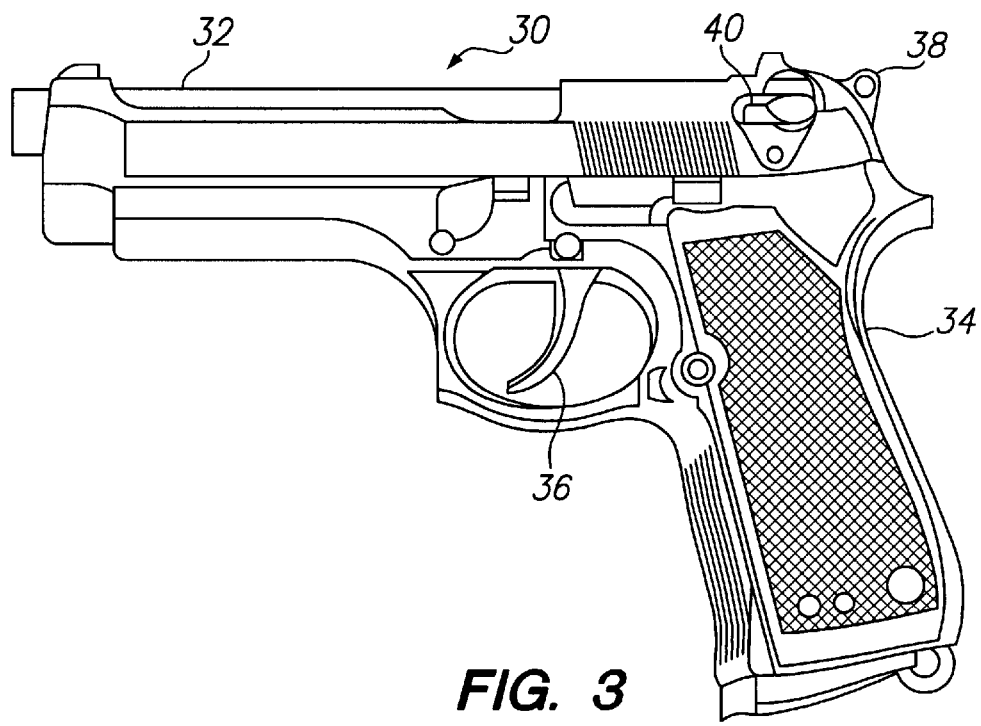
FIG. 3 is a perspective view of a conventional firearm.

A conventional firearm (handgun) 30 with a mechanical thumb safety 40 is shown in FIG. 3. The firearm includes a barrel 32, handle 34, trigger 36, and hammer 38 for firing of the weapon. In order to discharge a conventional firearm, the thumb safety 40 must be placed in the released/firing position before the firearm may be fired. When the safety is in an engaged position, the firearm will not fire. The conventional thumb safety 40 is a mechanical switch which can be operated by anyone regardless of age, ability or authorization.

Figure 4:
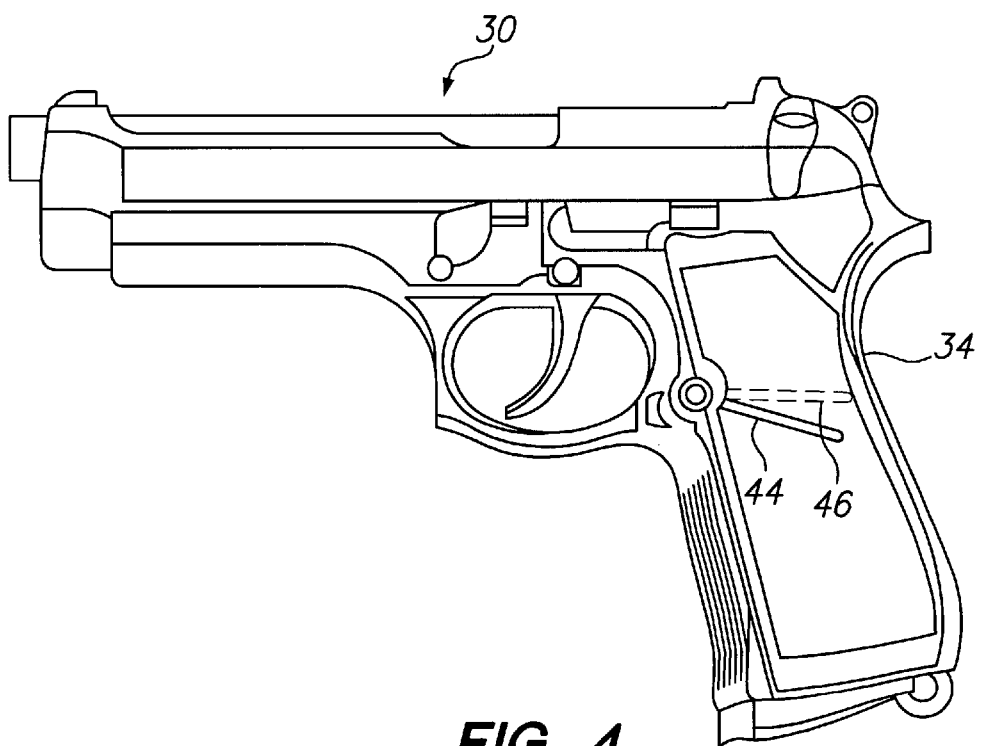
FIG. 4 is a perspective view of a firearm with the firearm safety system of the present invention.

A firearm with a firearm safety system of the present invention is shown in FIG. 4. The firearm is equipped with a safety switch 42 which is operable between a first position 44 preventing discharge of the weapon and a second position 46 allowing discharge of the weapon.

Figure 5:
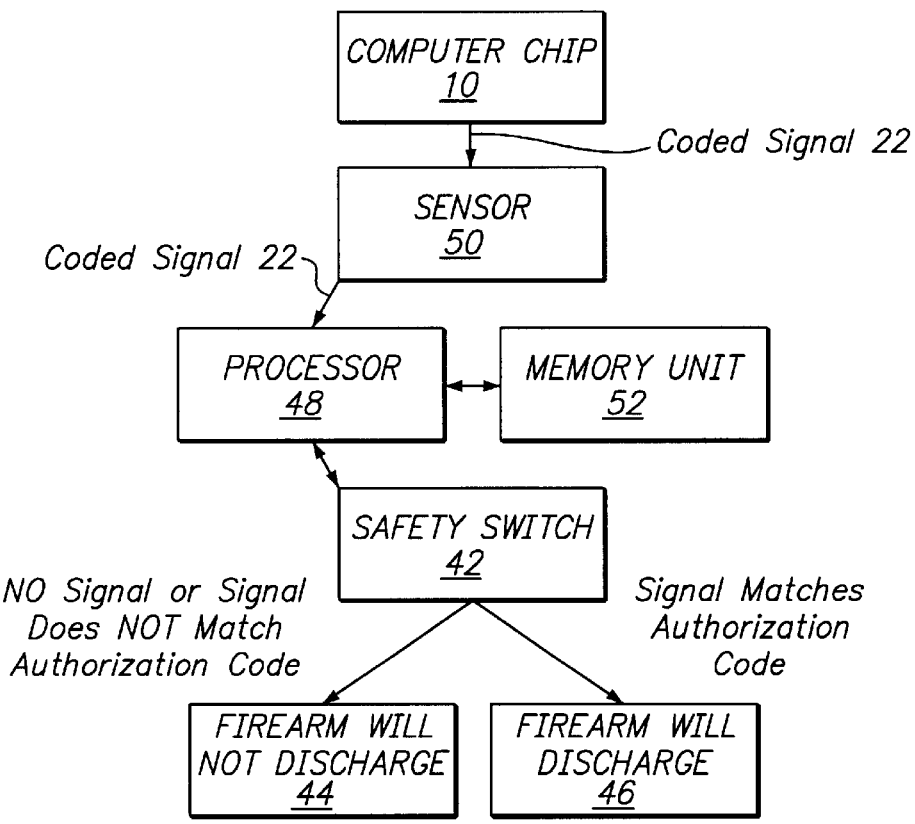
FIG. 5 is a schematic block diagram of the circuitry of the firearm safety system.

As illustrated in FIG. 5, the safety switch 42 is controlled by a processor 48. The processor 48 is connected to a sensor 50 which receives a coded signal 22 from the computer chip 10, and a memory unit 52 for storing a plurality of authorization codes. The authorization codes are representative of the coded signal 22 received from the computer chip 10 of the authorized user. The processor 48 receives the coded signal from the sensor 50 and compares the coded signal 22 to the authorization codes stored in the memory unit 52. If the sensor 50 does not receive a signal or if the coded signal 22 does not match the authorization code within the memory unit 52, the safety switch 42 will remain in the first position 44 preventing the firearm from discharging. If the coded signal 22 matches the authorization code stored in the memory unit 52, the processor 48 will cause the safety switch 42 to move to the second position 46, which will allow the firearm to be discharged.

The firearm safety system can be used with a standard 9 millimeter semi-automatic service weapon as shown in FIGS. 3 and 4 without significant modifications. The standard semi-automatic firearm 30, includes a trigger 36, hammer 38, barrel 32, and handle 34. The firing mechanism is considered to consist of the trigger, hammer, firing pin and slide. In most semi-automatic weapons a mechanical thumb safety 40 is provided as well as grip safety 41. Grip safety 41 comprises a conventional grip safety panel member which protrudes from the rear surface of the handle. Grip safety 41 mechanically interacts with the firing mechanism such that the firing mechanism is inoperable when the grip safety is in the first outward position and operable when the grip safety is in a second inward position. When firing of the weapon is desired, the user would deactivate the thumb safety 40 and grip the firearm handle thereby pushing the grip safety 41 inward in order to permit operation of the firing mechanism. The grip safety 41 design prevents unintentional firings when, for example, the firearm is dropped or mishandled.

An important aspect of the present invention is that the grip safety mechanism described above is a standard component of most semiautomatic handguns currently in use. Accordingly, the complex interaction of the grip safety 41, the hammer and firing pin mechanism 38, and safety switch 42 is already in place in these weapons. The disabling unit interacts with the grip safety 41 to place the weapon in an enabled or disabled state, and the grip safety in turn mechanically interacts with the firing mechanism to render the firing mechanism operable or inoperable. The present invention does not require modification of the firing pin mechanism but instead acts to selectively enable or disable the firearm by movement of the grip safety itself, thereby avoiding complex modifications to the firing pin mechanism. As a result, this design improvement avoids having to alter or redesign the firing mechanism resulting in significant savings in manufacturing costs and avoiding the need for complicated specialized components.

Figure 6:
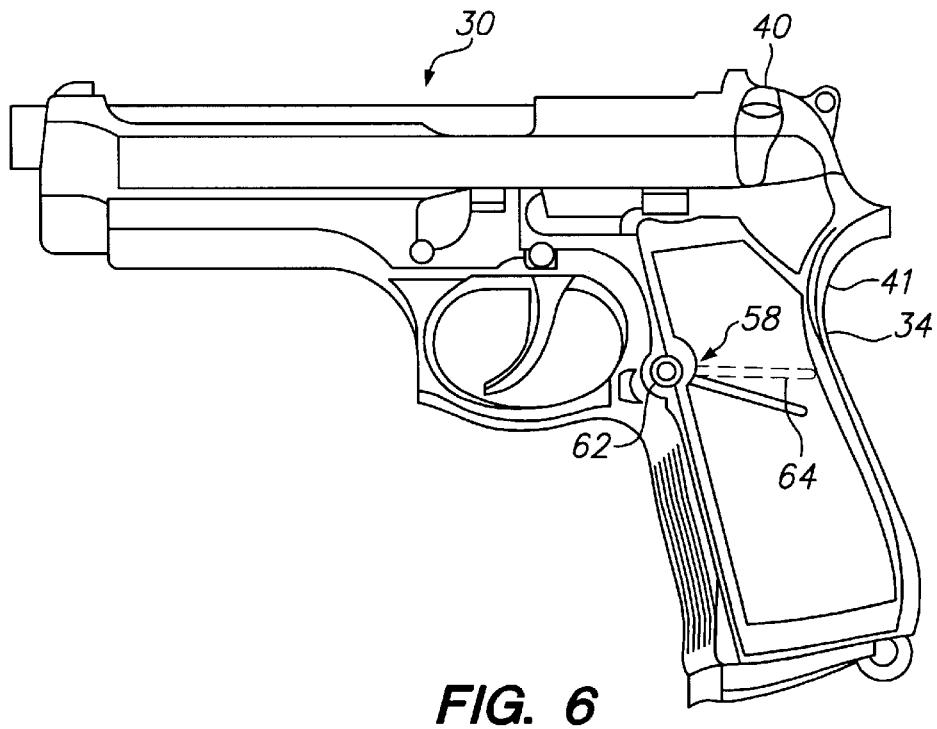
FIG. 6 is a side cut away view of the firearm safety system showing an alternative embodiment of the present invention.

In another embodiment, the invention includes a disabling unit 58 as shown in FIG. 6. The disabling unit includes a solenoid 62 which is operably attached to blocking lever or bar 64. When the firearm has been enabled by an authorized user, the solenoid is positioned such that the blocking lever 64 is retracted from the path of the disabling unit 58. The shaded blocking lever 64 as shown in FIG. 6 indicates this retracted position of the blocking lever. When the firearm has been enabled by an authorized user, the weapon will operate in a standard mode of operation. That is when the user desires to fire the weapon, the thumb safety 40 must be deactivated and the grip safety 41, which is now free to move, must be moved from a first outward position thereby allowing the firing mechanism to operate. When the firearm is disabled as described below, the solenoid 62 rotates thereby moving the blocking lever 64 into the path of the grip safety 41. The blocking lever 64 as shown in FIG. 6 prevents the grip safety from moving from its first outward position to its second inward position thereby rendering the firing mechanism inoperable.

In another embodiment, the safety switch is controlled by an electrical current conductor which functions to move the locking means from the first locking position into a second locking position by electrical current. The electrical current conductor is of a character such that when no current is flowing through the conductor, the conductor exhibits a first overall length. However, upon current flowing through the conductor, the conductor will shrink and exhibit a second overall length which is less than the static, noncurrent conducting length.

Figure 7:
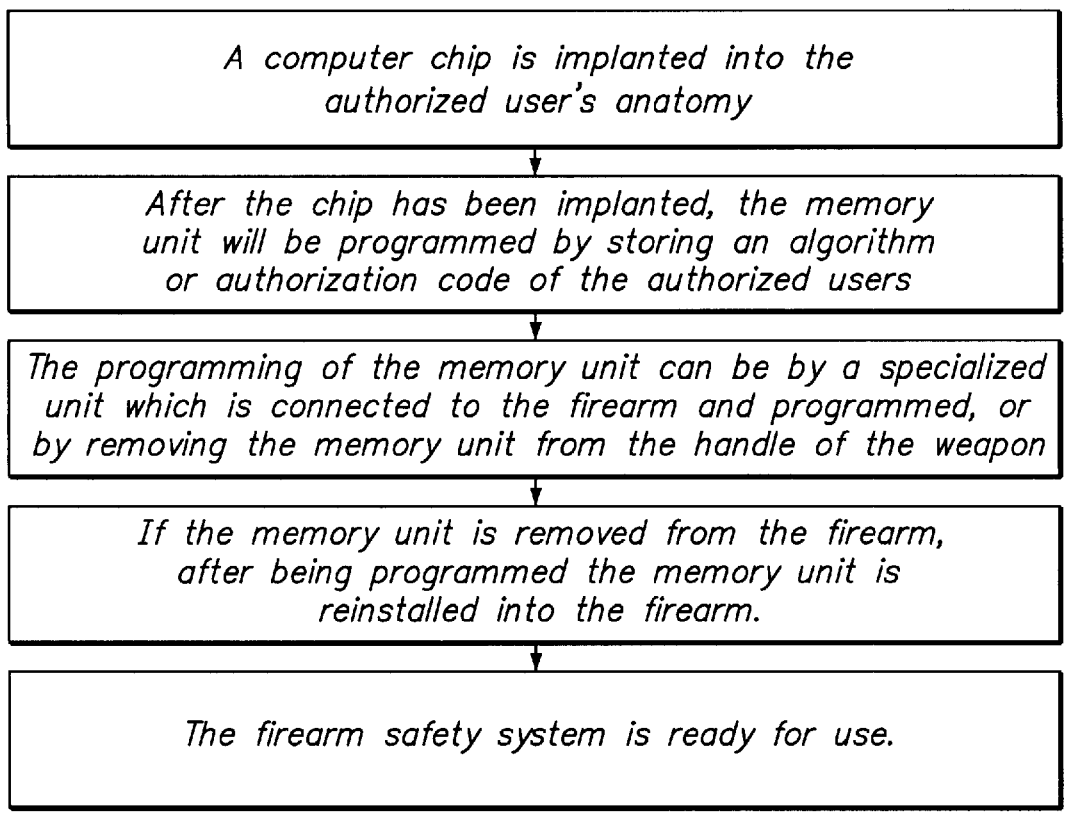
FIG. 7 is a schematic block diagram of the operation of the firearm safety system.

The programming of the firearm safety system is illustrated in FIG. 7. The authorized user will receive a computer chip 10 which is implanted into his anatomy. This will be performed by the use of a device for implanting articles under the skin. Computer chips of the micro variety can carry a multiplicity of information and can be coded to include several coded signals, a human's medical history and other relevant information. The computer chip 10 may also include additional information depending on the design and utilization of the firearm safety system.

After the chip has been implanted, the memory unit 52 will need to be programmed by storing an algorithm or authorization code of the authorized users in the memory unit. The memory unit 52 can be preprogrammed with an algorithm or authorization code. Alternatively the memory unit 52 can be programmed by use of a programming device.

The programming of the memory unit can be by a specialized unit which is connected to the firearm and programmed, or by removing the memory unit from the handle of the weapon. If the memory unit is removable, it can be designed to be programmed by personal computer or a special coding device. The coding device can be privately owned or for additional safety regulated by city, county or other agency. After being programmed the memory unit is reinstalled into the firearm.

Alternatively, the processor and memory unit can be programmed by magnetic means to change the authorization code.

The processor will be operated by a single battery. The battery can be a stand alone or operable on a detection device. However, the battery and processor should be embedded into a single "pill." In addition, replaceable batteries should not be used with the system. If replaceable batteries are used, the system can be disabled by removal or shortening of the batteries, thus negating the protection afforded by firearm safety system. Alternatively, if the battery is running low, the entire hand grip will need to be replaced, or alternatively, the processing unit will need to be replaced and the memory unit reprogrammed.

In another embodiment, the firearm safety system can be fitted with a trigger movement detection system to activate the battery as disclosed in Harling et al. U.S. Pat. No. 5,953,844. Upon movement of the trigger a signal is transmitted to the battery which then activates the processor. In addition to trigger detection devices, other detection means are readily available and can take the form of a position sensor, a motion sensor, or a pressure sensor, as long as the detection means immediately responds.

Additionally, the sensor, memory unit and processor can be externally placed on the firearm by modification of the firearm or manufactured with the sensor, memory unit and processor within the body of the firearm. In addition, the placement of the sensor, memory unit and processor can be chosen based on the firearm's specifications.

The firearm safety system can also be manufactured and sold as a kit. In one embodiment the kit will include the computer chip and sensor, memory unit and processor for modification of an existing firearm. Alternatively, a kit may include a computer chip and firearm with the sensor, memory unit and processor preassembled.

The use of an implantable chip is well known for various uses and functions and can be adapted for use with the following invention. For example, a readable chip implanted in animals and livestock for identification purposes is disclosed in Willham, U.S. Pat. No. 5,322,034, incorporated herein by reference. In addition, biosensing transponders for implantation into a human organism for sensing physical conditions have been disclosed in Kovacs U.S. Pat. No. 5,833,603.

Although the invention has been described using a computer chip, any type of embedded element or chip can be used as long as a sensing device can receive a signal from the embedded element or chip.

While the invention has been described in detail with reference to the preferred embodiments thereof, it will be apparent to one skilled in the art that various changes and modifications can be made and equivalents employed without departing from the present invention.

What is claimed is:

1. A firearm safety system comprising:
   a computer chip implanted into the human anatomy, the computer chip having a sensor, a transponder having at least one energy coupler, and a control circuit;
   a firearm having a barrel, handle, trigger, firing mechanism, and a safety switch operable between a first position preventing discharge of the firearm and a second position allowing discharge of the firearm, wherein the safety switch rests in the first position until operated to the second position;
   a sensor for receiving a coded signal from the computer chip;
   a memory unit for storing an authorization code representative of the coded signal received from the computer chip of an authorized user; and
   a processor connected to both the sensor and memory unit for receiving the coded signal from the sensor, converting the coded signal to an authorization code, and comparing the coded signal received from the computer chip to the authorization codes stored in the memory unit, wherein the processor controls the safety switch to operate in the second position upon determining the received coded signal matches one of the authorization codes stored in the memory unit.

2. The firearm safety system according to claim 1, wherein the safety switch comprises:
   a solenoid operably connected to a blocking element, the blocking element movable by the solenoid between a blocking position, whereby the blocking element blocks the safety switch from moving into the second position thereby disabling the firearm, and a retracted position whereby the safety switch is permitted to move into the second position thereby enabling discharge of the firearm.

3. The firearm safety system according to claim 1, wherein the safety switch comprises:
an electrical current conductor connected to the safety switch for moving the safety switch from the first position preventing discharge of the firearm to the second position allowing discharge of the firearm upon a current flowing through the electrical current conductor wherein the electrical current conductor comprises a length of wire having a first static length and a second static length shorter than said first static length upon the wire being heated by an electrical current flowing through the wire.

4. The firearm safety system according to claim 1, wherein the sensor is located within the trigger of the firearm.

5. The firearm safety system according to claim 1, wherein the sensor is located within the handle of the firearm.

6. The firearm safety system according to claim 1, wherein the sensor is located within the barrel of the firearm.

7. The firearm safety system according to claim 1, wherein the memory unit comprises a preprogramed chip of one or more authorized codes, such that the authorization code or codes are permanent read only codes.

8. The firearm safety system according to claim 1, wherein the memory unit comprises a replaceable chip such that the user of the firearm may replace the chip containing a first authorized user's code with that of a second authorized user's code.

9. The firearm safety system according to claim 1, wherein the processor and memory unit can be programmed by magnetic means to change the authorization codes.

10. The firearm safety system according to claim 1, wherein the firearm has a input port connected to the processor.

11. The firearm safety system according to claim 10, wherein the firearm has an input port for programming the processor to add or withdraw authorized users codes to and from the memory unit comprising a program key for initiating storage of an authorization code into the memory unit, an alphanumeric keypad for attaching authorization codes to be stored in the memory unit, a visual display for viewing the authorization codes stored in the memory unit, scroll keys for scrolling through the authorization codes displayed on the visual display, and an erase key for deleting an authorized user from the memory unit when an authorization code for the authorized user to be deleted is scrolled to on the visual display.

12. The firearm safety system according to claim 1, further comprising a power supply means.

13. The firearm safety system according to claim 1, wherein the power supply to the sensor, memory unit, and processor comprises at least one battery.

14. The firearm safety system according to claim 1, wherein the power supply is activated by a movement detection system associated with the trigger of the firearm.

15. The firearm safety system according to claim 1, wherein the power supply is activated by a pressure sensor associated with the handle of the firearm.

16. A safety system kit containing a safety switch comprising:
a computer chip adapted to be implanted into the human anatomy;
a sensor for receiving a coded signal from the computer chip;
a memory unit for storing a plurality of authorization codes representative of the coded signal received from the computer chip of authorized users; and
a processor for receiving the coded signal from the sensor, converting the coded signal to an authorization code, and comparing the coded signal received from the computer chip to the authorization codes stored in the memory unit, the safety switch is operable between a first position preventing discharge of a firearm and a second position allowing discharge of the firearm, wherein the processor controls the safety switch to operate in the second position upon determining the received coded signal matches one of the authorization codes stored in the memory unit, wherein the sensor, memory unit and processor are adapted for attachment to the firearm in operable relationship to the safety switch.

17. A safety system kit containing a safety switch comprising:
a computer chip adapted to be implanted into the human anatomy; and
a firearm having;
a barrel, handle, trigger, firing mechanism, safety switch operable between a first position preventing discharge of the firearm and a second position allowing discharge of the firearm;
a sensor for receiving a coded signal from the computer chip;
a memory unit for storing a plurality of authorization codes representative of the coded signal received from the computer chip of authorized users; and
a processor connected to both the sensor and memory unit for receiving the coded signal from the sensor, converting the coded signal to an authorization code, and comparing the coded signal received from the computer chip to the authorization codes stored in the memory unit, wherein the processor controls the safety switch to operate in the first position upon determining the received signal does not match the authorization code stored in the memory unit and controls the safety switch to operate in the second position upon determining the received coded signal matches one of the authorization codes stored in the memory unit.

18. The firearm safety system according to claim 1, wherein the computer chip is activated by a remote interrogator or reader.

19. The firearm safety system according to claim 16, wherein the computer chip having a sensor, a transponder has at least one energy coupler, and a control circuit.

20. The firearm safety system according to claim 16, wherein the computer chip is activated by a remote interrogator or reader.

21. The safety system kit according to claim 17, wherein the computer chip has a sensor, a transponder having at least one energy coupler, and a control circuit.

22. The safety system kit according to claim 17, wherein the computer chip wherein the computer chip is activated by a remote interrogator or reader.

* * * * *